May 19, 1936.  W. W. HARTMAN  2,041,340

KNIFE GRINDER

Filed May 16, 1934  4 Sheets-Sheet 1

Inventor.
William Walter Hartman.

Attorney.

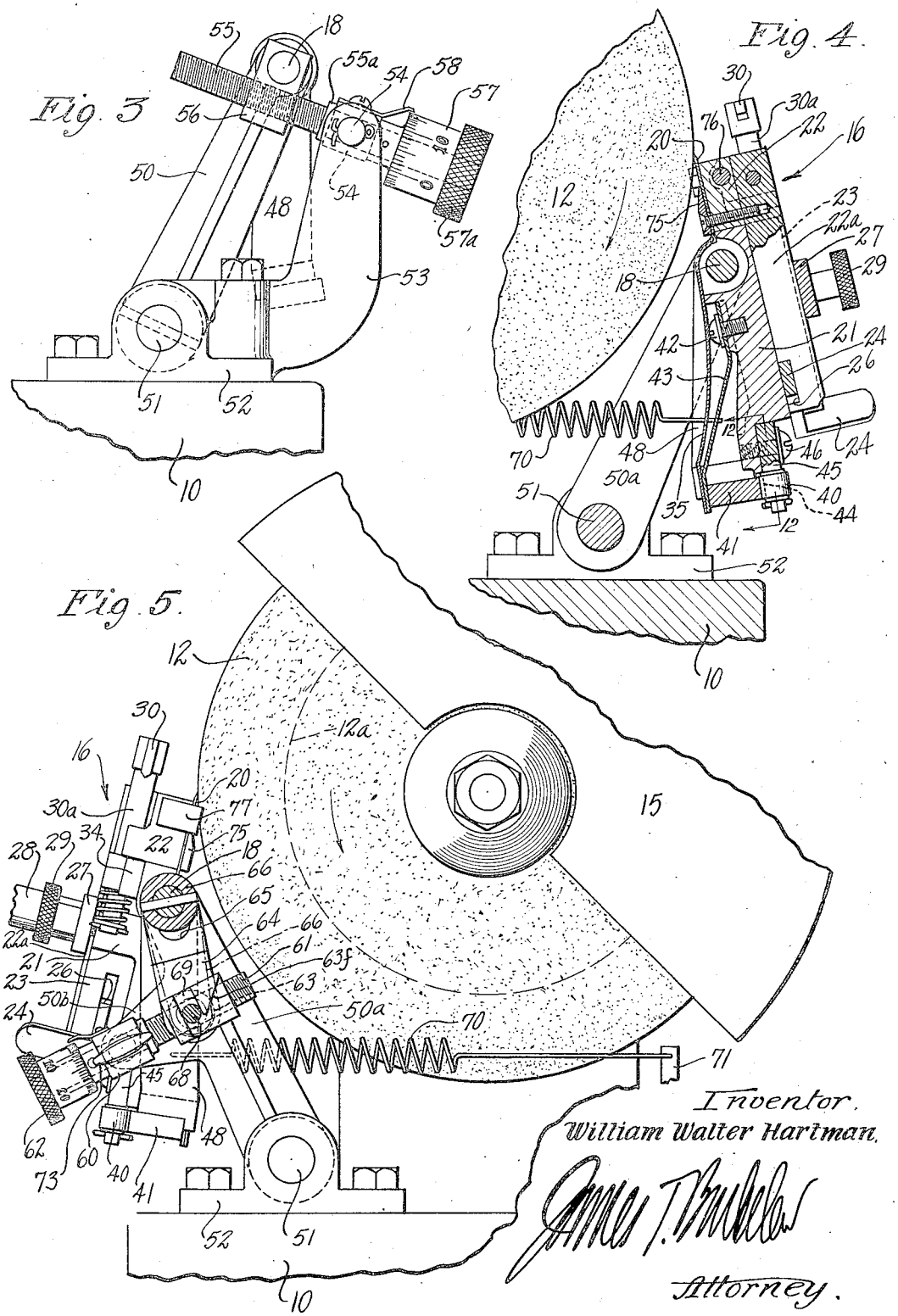

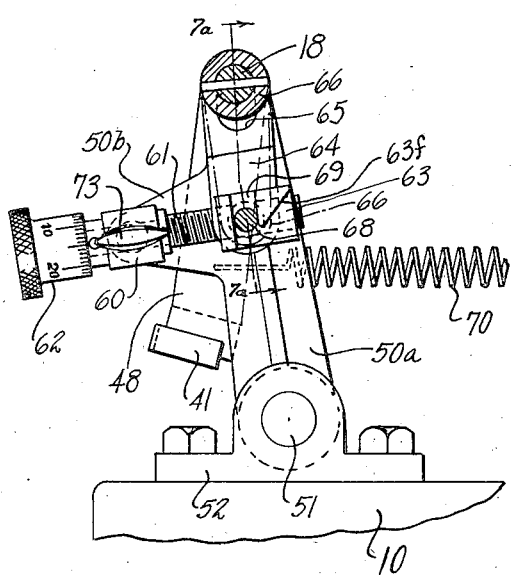
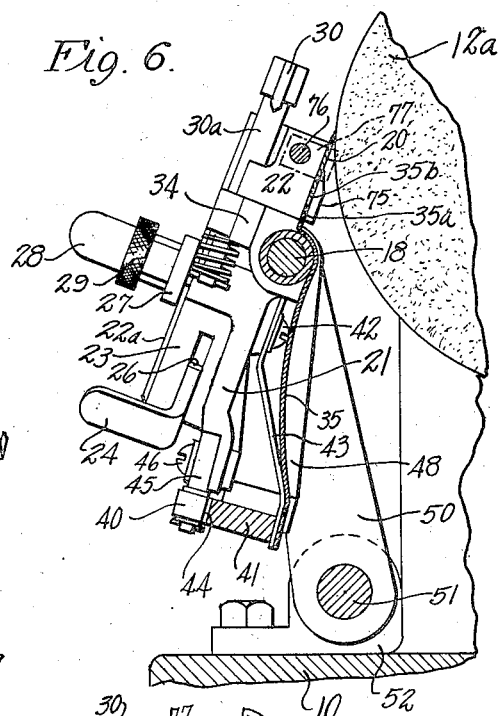
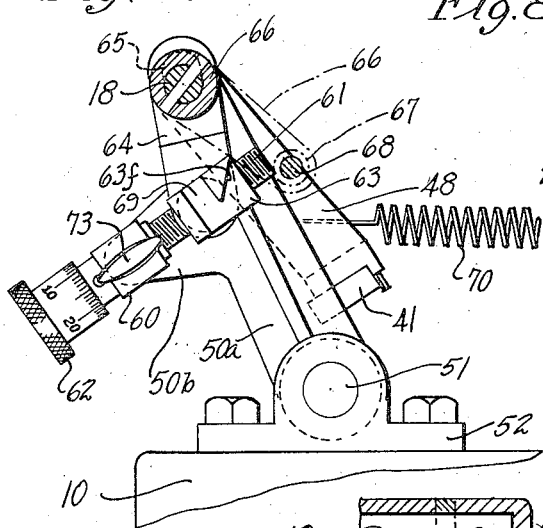
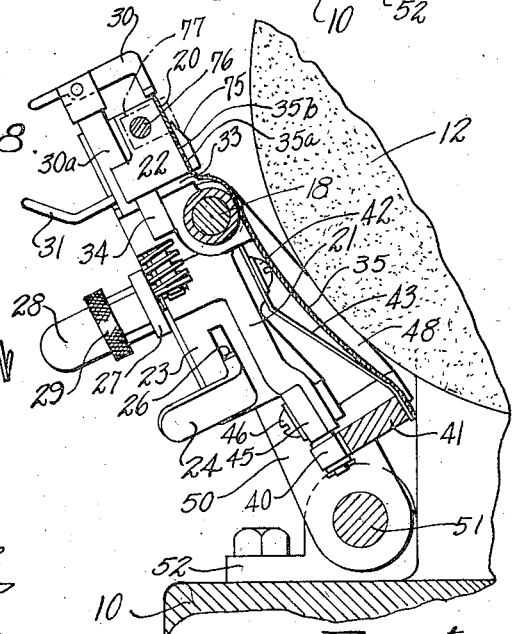
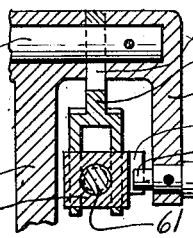

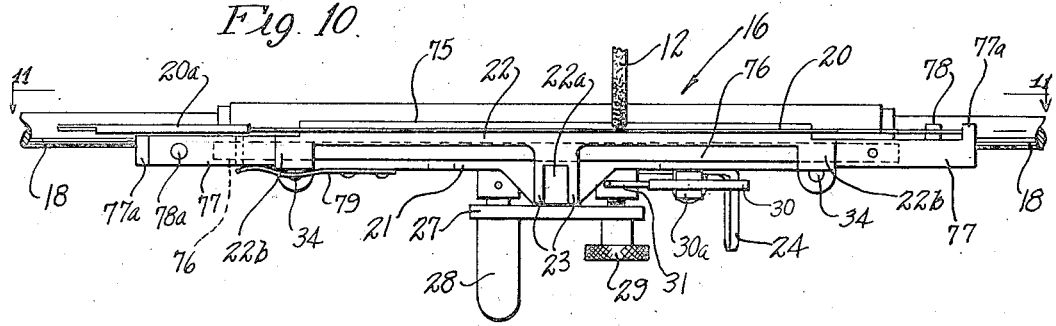
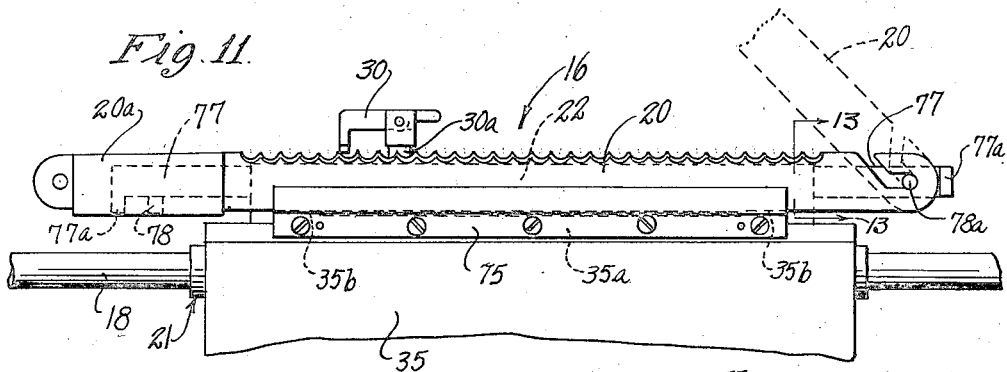
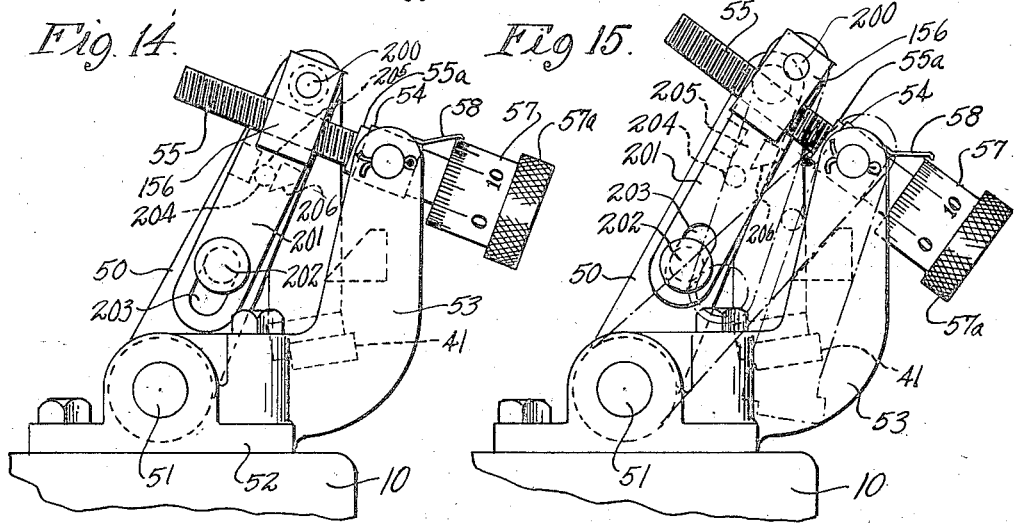
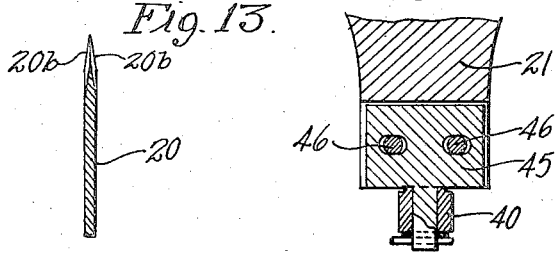

Patented May 19, 1936

2,041,340

UNITED STATES PATENT OFFICE 2,041,340

KNIFE GRINDER

William Walter Hartman, Los Angeles, Calif.

Application May 16, 1934, Serial No. 725,916

6 Claims. (Cl. 51—100)

This invention relates to grinders, and more particularly to grinders adapted to sharpen elongated knives or cutter blades. The invention, in some of its aspects, is not limited to arrangements for grinding serrated edges; although the machine as here illustratively described is particularly adapted to that purpose. Blades of this type have a "wavy" edge rather than pronounced teeth as in a saw, are sharpened by grinding the longitudinal sides of the blades instead of the transverse edges of the teeth. In this manner a continuous sharp edge is formed on the blade, the profile of the edge being shaped as desired.

A typical illustrative use of blades of this type occurs in bread slicing machines, and I refer to such use in order to bring out the advantages of my invention, though it will be realized that the use to which the blade is put is immaterial as regards the present invention. In bread slicers, the slicing means comprises a series of rapidly moving knives past which the loaves are moved as fast as possible in order to maintain a high output rate from the machine. However, continual use dulls the keen edges of the cutters in a short time, a condition that affects adversely the quality of the sliced loaf for dull knives produce a ragged cut with many crumbs.

Thus the knives need frequent resharpening and it is desirable that this operation be performed quickly, easily, economically, and accurately. This last is important since if the blade is ground with one bevel longer than the other, so that the cutting edge is not centered on the blade, the pressure on the longer bevel causes the blade to "run" to one side instead of cutting on a straight line.

Heretofore, grinders have been invented for straight edged blades but are not suited to shaping and grinding serrated edges. Therefore, it becomes a particular object of my invention to provide a grinder that will quickly and easily grind cutter blades having a serrated edge and will automatically shape the edge as desired; and a general object to provide an improved grinder mechanism suitable for grinding long edges of any shape.

It is also an object of my invention to provide a grinder that will accurately center the cutting edge relative to the blade thickness.

A further object is to provide means for adjusting the angle of the blade to the grinding stone so that the inclination may be varied to change the length of bevel, or may be adjusted to compensate for change in the diameter of the grinding stone caused by wear, thus keeping the bevel at a constant value.

In a grinder embodying my invention, there is provided a blade-supporting carriage movable longitudinally of the blade and transversely of the plane of rotation of the grinding wheel, and means to periodically oscillate the carriage in said plane of wheel rotation to shape the blade edge, the oscillatory motion resulting from the longitudinal movement of the carriage. The carriage is preferably mounted to be swung in an arc toward the wheel by means of a feed screw having associated therewith an index to show the amount of feed or the point to which the carriage has been advanced. After one edge of the blade has been properly sharpened, the reading of the index is noted so that the other side of the blade may be sharpened with the assurance that when the index again reads as before that the sharpening on both sides of the blade will have been equal and the cutting edge will be centered on the blade.

Since the carriage is mounted on a swinging guide to move through an arcuate path to bring the blade into grinding position, the inclination of the blade with relation to the grinding surface changes with the position of the carriage; and, as the grinding wheel wears down, the carriage must be advanced further to bring the blade into contact with the wheel. Consequently, the final position of the blade with respect to the smaller wheels will be appreciably different from the position with respect to the full size wheel, and there will be, if not compensated for, an attendant change in length of bevel. The carriage is mounted on the swinging guide to rock the blade through an arc of relatively short radius to adjust the blade inclination, which adjustment may be used to secure a desired length of bevel on the blade and also to compensate for the change in blade inclination caused by wear of the grinding wheel.

How the above and other objects and advantages of my invention are secured may be more readily understood from the following description and the annexed drawings wherein I show and describe a present preferred form of my invention.

In the drawings: Fig. 1 is a front side elevation of a grinder constructed in accordance with my invention;

Fig. 3 is an enlarged fragmentary elevation of the carriage feed screw and index taken as indicated by line 3—3 in Fig. 1;

Fig. 4 is an enlarged vertical section on line 4—4 of Fig. 1 showing the blade-supporting carriage in grinding position;

Fig. 5 is an enlarged fragmentary elevation, partly in section, on line 5—5 of Fig. 1 showing the bevel adjustment mechanism;

Fig. 6 is an enlarged fragmentary section on line 6—6 of Fig. 1 showing the carriage in grinding position with a wheel of reduced diameter;

Fig. 7 is a view of the bevel adjustment screw alone as on line 5—5 of Fig. 1 when the carriage is in the position of Fig. 6;

Fig. 7a is a detail section on line 7a—7a of Fig. 7;

Fig. 8 is a view similar to Fig. 6 showing the carriage tilted away from the grinding wheel into the blade mounting position;

Fig. 9 is an elevation similar to Fig. 7 showing the adjustment latch in released position to swing the carriage into the position of Fig. 8;

Fig. 10 is a detached plan view of the blade carriage;

Fig. 11 is a fragmentary elevation of the blade carriage from the direction of line 11—11 of Fig. 10;

Fig. 12 is a section on line 12—12 of Fig. 4 showing the adjustment for the cam follower roller;

Fig. 13 is a vertical section of a cutting blade on line 13—13 of Fig. 11; and

Figs. 14 and 15 are two end elevations, in the same aspect as that of Fig. 3, showing a modification.

Figure 1:
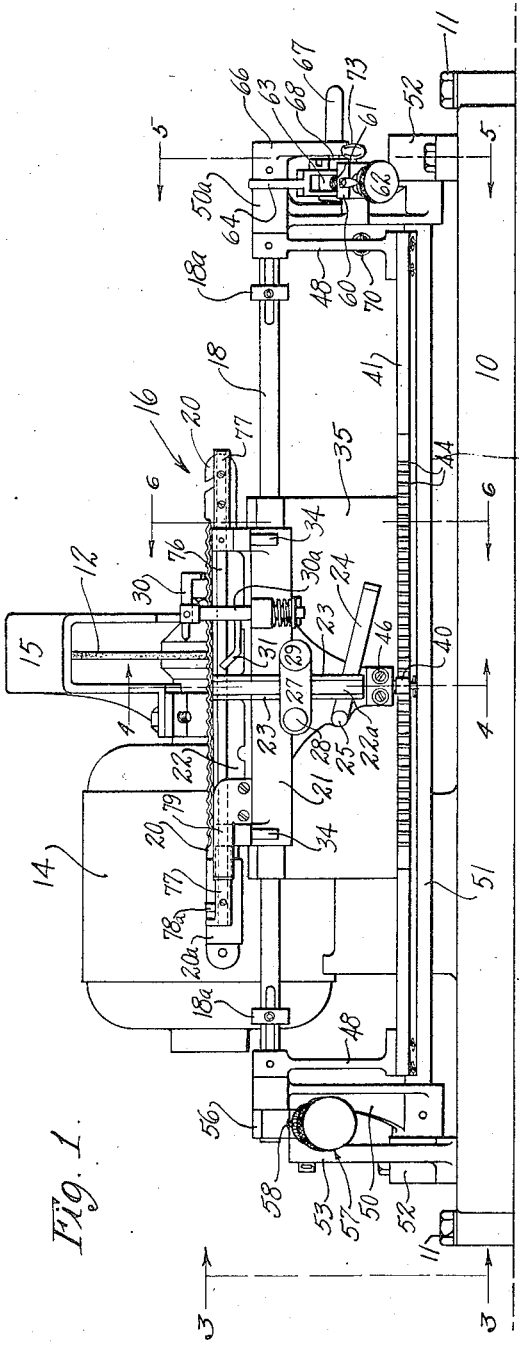
Figure 2:
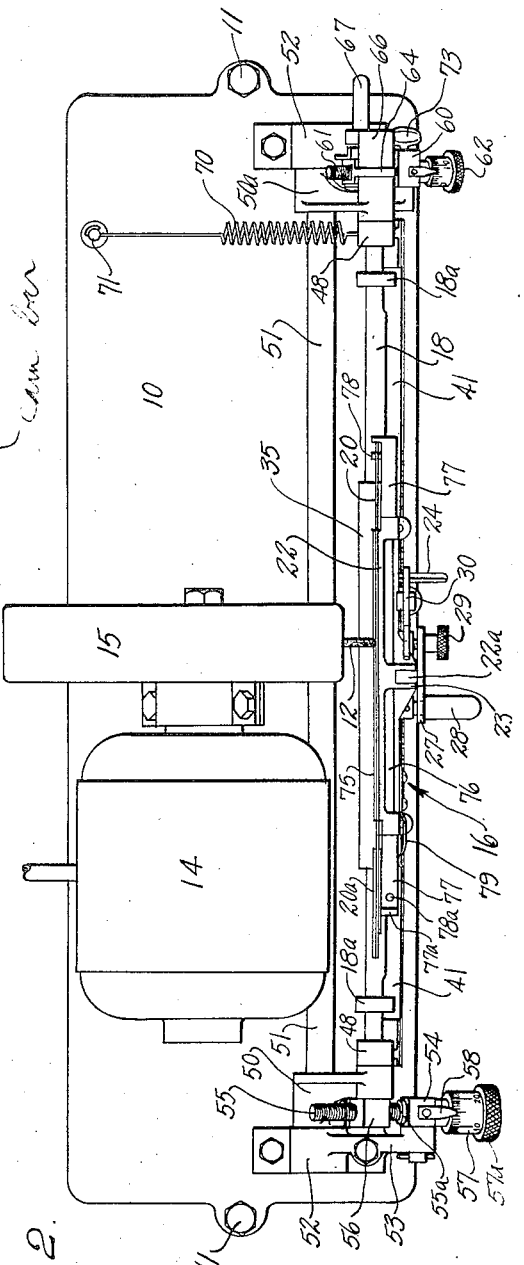
Fig. 2 is a plan view of the grinder.

By referring to Figs. 1 and 2 it will be seen that the grinding mechanism is mounted on base plate 10 which may be secured to a table or other support by bolts 11. A preferred form of grinding means comprises a thin, disc-like grinding wheel 12 fastened to one end of the rotor shaft of motor 14, guard 15 being mounted on the motor casing to cover the upper portion of the wheel. This is a well known conventional type of motor-driven grinding wheel and is typical of such grinding means as may be used, it being possible to use other types of grinding means.

The blade-supporting carriage is generally indicated at 16. This carriage is mounted to slide along rod 18 which parallels the drive shaft of motor 14 so that this sliding movement is parallel to the axis of grinding wheel 12 and transverse to its plane of rotation. Stops 18a are held in place on rod 18 by set screws to limit the carriage travel. The carriage is adapted to so position a blade 20, as will later be described in detail, parallel to shaft 18 that the carriage movement is longitudinal also of the blade, and one longitudinal side of the blade is moved across the periphery of the revolving grinding wheel.

Carriage 16 generally comprises a main body portion 21 and a relatively movable blade holder 22. The blade holder is T-shaped, the horizontal cross-piece supporting blade 20 and the stem portion 22a sliding vertically in guide way 23 on body 21. Blade holder 22 is movable vertically for adjustment, by means of lever 24 pivoted at 25 to body portion 21 and engaging stem 22a by means of notch 26, as may be seen in Fig. 4. Stem 22a projects above the sides of guide 23 and is held against displacement from adjusted position by clamp bar 27 which is held at one end under handle 28 and is brought to bear against stem 22a by turning down thumb screw 29. This vertical adjustment enables the operator to bring the cutting edge of a blade always to the same definite line on the carriage determined by height gauge 30 which is pivotally mounted on post 30a on carriage body 21 so that it may swing out over the blade into gauging position and then back again to the position of Fig. 1 where it will not interfere with the sharpening operation. Handle 31 is provided to turn post 30a. Fig. 8 shows gauge 30 swung into gauging position to locate the edge of a worn blade of less than the normal maximum width, blade holder 22 being raised from the main body 21 by the distance indicated at 33 to bring the cutting edge of blade 20 up to the predetermined point set by gauge 30. To aid in keeping blade 20 properly positioned, there is provided a square guide pin 34 at each end of movable carriage portion 22, these guide pins sliding over machined faces on body 21 to assure that blade holder 22 and blade 20 are maintained parallel to rod 18 and at right angles to wheel 12.

Shield 35 of sheet metal is provided to keep grinder dust from getting into the moving parts of the carriage. This shield is shown supported from blade holder 22 but may instead be attached directly to the main body portion.

The downwardly extending portion of the carriage body carries at its lower end a small roller 40 which rides over the front face of cam or guide bar 41, the mounting of which will be described below. Attached to the carriage body by bolt 42, see Fig. 4, is leaf spring 43 which slides over the smooth back face of the cam bar and resiliently presses roller 40 into contact with the operating face of the cam. The operating face of bar 41, in this particular form of device, has thereon a series of ridges 44 (Fig. 1) which periodically, during longitudinal movement, causes the carriage as a whole to rock about the center of rod 18 and thereby bring blade 20 toward wheel 12 to form the depressions in the serrated cutting edge. The form of edge attained is controlled by the form of operating face of bar 41, and the form of cutting face on the wheel. By varying these any desired cutting edge form may be attained, either straight and plane, or serrated or wavy of many forms.

From Fig. 12 it will be seen how longitudinal adjustment in the position of the cam follower roller may be made. Plate 45, which forms the bearing for roller 40, is secured to the carriage by bolts 46 which pass through elongated slots in the plate, so that by loosening bolts 46 the cam follower roller may be shifted along the cam and with respect to the carriage and then the bolts tightened again to hold the follower in adjusted position. The purpose of this adjustment will be seen later.

Cam bar 41 is supported at its extremities from the lower ends of arms 48 (Fig. 1) which are pinned at their upper ends to rod 18 so as to be rigidly secured thereto. By this construction, cam 41 turns with rod 18 and is always in the same angular position relative thereto and to carriage 16 which is guided as well as supported by rod 18. Rod 18, bar 41, and arms 48 may be regarded as forming, as a whole, a carriage guide; on which the carriage is longitudinally slidable, and rotatable (about center of rod 18) both for adjustment of cutting angle and cam operated change of depth of cut.

Rod 18 is journalled in the upper ends of rocker arms 50, 50a, which at their lower ends are pinned to rock shaft 51 that is journalled at its extremities in bearings 52 bolted to base 10. Fashioned as a part of the left hand bearing 52 (as viewed in Fig. 1) is a bracket arm 53 carrying at its upper end swivel block 54, as may be seen from Figs. 2 and 3. Feed screw 55 is mounted to turn freely within swivel block 54, head 57 and collar 55a preventing longitudinal movement, while a second swivel block 56, mounted on the extreme end of rod 18, is provided with an internally threaded bore to receive the threaded portion of feed screw 55. By turning screw 55, block 56 is moved along the threaded portion of the screw and rod 18 describes an arc of relatively long radius about the center of rock shaft 51.

Fastened to one end of feed screw 55 is an index head 57 having knurled gripping portion 57a. Associated with this head is pointer 58 fastened to swivel block 54. Together, pointer 58 and head 57 with the scale thereon form index for indicating the feed of rod 18 along its arcuate path. The threads on screw 55 may be so correlated with the calibrations on drum 57 that each sub-division of the scale indicates a definite fractional part of an inch, though this is not necessary as it is only desired that the index show the point to which rod 18 has been advanced so that it may be again advanced to exactly the same point.

Turning now to the other end of the machine, there is found means for adjusting the inclination of the blade so as to change the length of bevel 20b on the blade; and also means to release the carriage and carriage guide, so that the carriage may be swung away from grinding position when a blade is put on or taken off the carriage. This mechanism is shown in end elevation in Figs. 5, 7, and 9. It will be seen that rocker arm 50a has a projection 50b on which is pivotally mounted swivel block 60 in which adjustment screw 61 freely rotates but is held longitudinally. The adjustment screw is provided with a head 62. Traveling block 63 is internally threaded to receive adjustment screw 61 and the block travels back and forth along the screw as the latter rotates. The traveling block is supported by link 64, the lower end of which is bifurcated and pivotally carries the traveling block 63, as may best be seen from Figs. 9 and 7a. Reference to Fig. 5 shows that the upper end of link 64 is slotted at 65, through which slot passes rod 18 to support the link.

To the end of rod 18 is pinned lever arm 66, the arm being sufficiently spaced from the upper end of arm 50a so that link 64 may freely move therebetween. At the outer end of arm 66 is attached handle 67 an extension of which forms locking pin 68, this pin being shown in section in Fig. 5 projecting from the inner face of arm 66. Pin 68 is received in slot 69 formed in the side of traveling block 63, the material in front of the slot being cut away to form an oblique latching face 63f that lifts the block as pin 68 is brought backward toward the slot. When arm 66 is moved rearwardly to bring pin 68 into position of Fig. 5, block 63 may drop or be depressed to engage the pin in slot 69. This locks arm 66 against swinging movement with relation to rocker arm 50a so that rod 18 is then held relatively stationary except for the adjusting movement that may then be given arm 66 and the carrier guide by rotating the adjusting screw 61. When head 62 is depressed, block 63 is raised, releasing pin 68 from the slot 69 so that the pin is free to swing forward to rotate rod 18 and the carriage guide thereby bringing the carriage and its guide into the position of Figs. 8 and 9. Carriage 16, and the carriage guide that includes cam bar 41 are thus permitted to swing about rod 18 to move the upper portion of the carriage away from the grinding wheel into what is termed blade mounting position, since in this position the blade is removed from contact with the wheel so that blades may be easily changed on the carriage. Spring 70 is attached to stationary pin 71 and to one of the arms 48 so that upon depressing knob 62 to release pin 68, the pull of spring 70 moves the carriage into blade mounting position.

When the carriage has been moved forward so that pin 68 is again held in slot 69, turning the adjustment screw 61 moves traveling block 63 and pin 68 which causes rod 18 (and the whole carriage guide) to rotate, together with the blade carriage mounted thereon. The adjusting screw may be locked in any set position by means of thumb set screw 73 in swivel block 60.

From the foregoing, it will be seen that block 63 forms a means for locking the carriage and carriage guide adjustably in grinding position and for releasing them to swing into blade mounting position; and when in locked position, the block is a means for transmitting, through its own movement, angular adjusting movement to the carriage and guide.

Returning now to carriage 16 for consideration of the manner of mounting and positioning the blade, it will be readily understood that the blade should be accurately positioned vertically, and, in this particular form of device where a wavy edge is ground, should be accurately positioned longitudinally. Figs. 6 and 11 show how a blade retaining slot is provided on blade holder block 22 by strip 75 which is spaced from holder block 22 by the thickness of the blade, the spacer in this case being the upper edge 35a of guard shield 35. The edge of the shield which acts as the spacer is cut away at the center leaving two shoulders 35b (see Fig. 11), one at each end of the knife receiving slot, upon which the back edge of blade 20 rests. When the blade is firmly seated in the slot on shoulders 35b, the blade is horizontal and parallel to rod 18, and is held in that position by its friction tight fit in the slot.

Journaled in bearings 22b at the ends of blade holder 22 is a longitudinal shaft 76 to the ends of which are secured registration heads, in the form of sleeves 77, which are substantially square in cross-section. A register pin 78, 78a, is mounted in each of the blocks, the heads 77 being angularly spaced about shaft 76 so that pins 78, 78a are spaced 90° apart. It will be understood how either of these pins may be brought into operative position from a consideration of Figs. 10 and 11. In Fig. 10 blade 20 is longitudinally registered by being attached to pin 78, and in Fig. 11 the blade has been turned end-for-end and is attached to pin 78a which has been brought into operative position by rotating shaft 76 a quarter-turn. Leaf spring 79 bears against one of the flat sides of a register head so as to prevent free turning of the shaft and heads. The heads also act as collars on shaft 76 to prevent longitudinal movement in bearings 22b. The particular type of blade herein illustrated has a reenforcing portion 20a at one end and the faces of register heads 77 are set back from the back edge of the blade retaining slot in order to accommodate this thick end portion of the blade, see Fig. 10.

In order to sharpen both sides of the blade, the blade must be reversed after one side has been ground, so that if only a single register pin were used it would become necessary to register the blade longitudinally first by engaging one end and then the other end of the blade, in the single register pin. It is preferred to provide two register pins and always engage the blade at the same end, first at one end of carriage and then at the other end, for, as shown here, some blades are non-symmetric in design and require the use of two register pins. At the same time the two will take care of a symmetric blade, although only one is necessary. When the blade has a longitudinal attaching slot, as shown at the right hand end of Fig. 11, it is preferable to provide the register heads with lugs or projection 77a which bears against the ends of the blade to prevent endwise displacement.

In order to obviate the necessity of adjusting the position of cam roller 40 every time a blade is reversed to grind the opposite side, each register pin is spaced an integral number of serration pitches, and the two are preferably spaced an equal number of such pitches, from some fixed point on the carriage, preferably the center line on which roller 40 is located. The serration pitches are, of course, fixed by the pitch of the cam formation on guide bar 41.

With the foregoing structure in mind, the setting and operation of the machine will now be briefly described. First, carriage 16 is tilted backwardly into blade mounting position which is the position of the parts shown in Fig. 8. This is accomplished by depressing the head of bevel adjustment screw 61 so as to raise the traveling block 63 which permits pin 68 to be released from slot 69 in block 63. Rod 18 is now free to rotate in the bearings at the upper end of rocker arms 50, and 50a, and the tension of spring 70 pulls arm 48 forward which rotates rod 18. Arms 48 carry cam bar 41 in constant position relative to rod 18 so that the cam and guide bar which is gripped between cam follower 40 and spring 43 rotates carriage 16 along with rod 18.

To mount blade 20 on the carriage, the slot at the end of the blade is hooked over one register pin as shown by the dotted line in Fig. 11. The blade is then pressed downwardly, rotating it about pin 78a, into the blade retaining slot behind strip 75. The blade is now registered in longitudinal position at right angles to the plane of rotation of the grinding wheel. If a smooth blank is placed in carriage 16, a serrated cutting edge of the general outline shown in Fig. 11 will now be formed on the blade if the carriage be now moved back and forth longitudinally and feed screw 55 operated to feed the carriage and blade toward the wheel; and when the blade is subsequently resharpened, gauge pin 78a, cooperating with projection 77a, will always again position the blade longitudinally so that the depressions in the cutting edge occupy the same positions relative to the carriage as when the blade was originally sharpened.

It may happen that with a blade ground originally on another machine, that the depressions in the cutting edge do not fall into the correct position with regard to the cam bar. In this case adjustment may be easily made by shifting the cam follower roller 40 in one direction or the other as required. In such a case the carriage is moved until a high point on the blade edge comes directly opposite the center of wheel 12 as shown in Fig. 1. At this time the cam roller 40 should occupy a position exactly intermediate two ridges 44 on the cam bar. Screws 46 may be loosened to shift the roller as required to fulfill this condition. This shift is, in actual effect, a shift relative to the register pins 78.

For uniformity in sharpening it is desirable that the cutting edge of the blade be carried in the carriage always in the same position relative to the horizontal center line of the grinding wheel. But as the blade is used the blade width diminishes, and the blade is always positioned in the carrier against its back edge. It is to compensate for this wear that the blade holder on the carriage is made vertically movable. To raise the cutting edge into position, screw 29 is loosened and blade holder 22 lifted by means of lever 24 until blade 20 touches the lower portion of height gauge 30, as may be seen in Fig. 8. When the blade edge has reached this predetermined position, screw 29 is tightened to clamp the blade holder into position by means of pressure on the stem 22a; and height gauge 30 is then rotated about post 30a by means of handle 31 into the position of Fig. 6 where it will not interfere with sharpening the blade.

After the blade has been thus properly vertically positioned, the carriage is moved forward into grinding position (Figs. 4 and 5) by grasping handle 67 and rotating rod 18 and with it the carriage. The carriage is locked in this position by lifting the head of feed screw 61 and lowering block 63 to engage pin 68 in slot 69 as indicated in Fig. 5.

After motor 14 is started, the actual sharpening operation may be commenced. The blade is moved against the grinding stone by turning feed screw 55. Swivel block 56 is thus advanced along the feed screw to swing rod 18 and the carriage mounted thereon through an arc about the center of rock shaft 51. As the blade comes into contact with wheel 12, handle 28 on the carriage is grasped between the fingers and the carriage moved longitudinally along rod 18 for the distance between limit stops 18a.

As the grinding wheel thus traverses the longitudinal edge of the blade, the blade oscillates about rod 18 as cam follower 40 encounters ridges 44 on the cam bar. Each of these small ridges moves the follower away from the cam bar and causes blade 20 to tilt toward the grinding stone thus forming a depression in the cutting edge of the blade with the result that the number and spacing of the depressions in the cutting edge correspond to that of ridges 44. It will be understood that these several tiltings of the carriage following each other in quick succession produce, in effect, a rapid oscillation of the blade toward and away from the grinding stone that is caused by means actuated by the longitudinal movement of the blade so that the blade has a simultaneous movement both in the plane of rotation of the grinding wheel and transverse to said plane of rotation.

Either before, or during, the grinding operation, bevel adjusting screw 61 is rotated to set the carriage and blade at the proper angle relative to the wheel periphery at the point of grinding contact, to get the angle of bevel finally desired on the blade. This bevel angle setting once having been made, and the cutting edge of blades always contacting the wheel at a fixed point by reason of the vertical setting described; it is then unnecessary to change the bevel angle setting, except slightly as the wheel wears down, to always grind to a standardized bevel. The grinding is then simply continued until a sufficiently long bevel has been ground. Then adjusting screw 62 may be depressed, releasing pin 68 and allowing the carriage to swing back into blade mounting position. This movement of the carriage takes place about the axis of rod 18 and consequently does not disturb the final setting of the feed screw and the index thereon.

The blade may now be reversed, in order to sharpen the other side, by lifting the blade out of the retaining slot, turning shaft 76 to bring the other register pin 78 into operative position, and re-inserting the blade into the blade holder but registered from the opposite end of the carriage. Before swinging the carriage forward, the reading of the feed screw index is noted and then the feed backed off a slight amount so that when the carriage is again locked in the forward grinding position the blade will not be in contact with the wheel 12. The second side of the blade is sharpened in the same manner as described, the carriage being fed by screw 55 until the same final reading is had on head 57 as was noted before. This indicates that the blade has been advanced an equal amount both times towards the grinding wheel and that the cutting edge is centered along the blade with bevels 20b (Fig. 13) of exactly equal length.

The taper of the cutting edge or the length of bevel is of course determined by the inclination of the blade to the grinding wheel, the greater the inclination the shorter the bevel. This inclination is controlled from adjusting screw 61 by changing the position of block 63 and pin 68, for movement of pin 68 causes rotation of shaft 18. This is the same movement that swings the carriage away from grinding position, only it is much slower and on a much smaller scale accurately controlled. It will be noted that the adjusting movement of the cutting edge is through an arc of much shorter radius than that arc through which the feeding movement takes place. In this manner a suitable range of angular shift may be obtained without too great a linear displacement of the cutting edge.

The inclination of the blade is set so that at the completion of the sharpening operation the blade has the desired bevel; and by so doing, even though the carriage as a whole is advanced through an arcuate path by screw 55, the final position of the blade is that which it would occupy were the carriage advanced through a rectilinear path.

Continued wear naturally reduces the diameter of wheel 12 until, in the end, some such dimension is reached as is indicated by the dotted line 12a in Fig. 5. In order to reach the wheel of smaller diameter, carriage 16 has been advanced by feed screw 55 for a considerable distance from positions of Figs. 3 and 5, and consequently the angle the blade makes with the wheel has been increased with a proportionately shortened bevel. This inclination is the angle between the blade and the tangent to the wheel at the point of contact and, in moving from contact with a wheel of large diameter as shown in Fig. 5 to a wheel of diameter 12a, this angle of inclination will if uncompensated, be increased by approximately the angular movement of arms 50, 50a. In order that the proper inclination be given blade 20, it is necessary that the blade be rocked counter-clockwise (Fig. 6) about rod 18 by means of screw 61 as described above.

Fig. 6 shows a grinding wheel of the smaller diameter 12a with the carriage so adjusted as to bring the blade into the same angle of inclination with the wheel as in Fig. 5. Fig. 7 shows the corresponding position of the bevel adjusting screw. It will be observed that traveling block 63 has been moved towards the end of screw 61, carrying with it pin 68, so that rod 18 has been rotated in a counter-clockwise direction which has moved blade 20 arcuately in a direction opposite to that of the feed movement of screw 55. The proper setting of screw 61 is retained by tightening set screw 73 so that the adjustment screw will not be disturbed by latching and releasing the carriage from grinding position. From this discussion it will be seen that the bevel adjustment means may be utilized not only to obtain a longer or shorter bevel as desired, but may also be utilized to compensate for the change in inclination of the blade to the grinding wheel caused by wear of the wheel, to maintain substantially the same bevel throughout the entire feed range of screw 55.

In the foregoing description the blade has been described as being fed toward the grinding wheel by movement at a relatively long radius about the center of rock shaft 51; and as having its inclination adjusted by movement about a relatively shorter radius on the non-concentric center of shaft 18; and the release which allows the blade to be backed away from the grinding wheel without disturbing settings, has been described as applied to the movement on the shorter radius, about shaft 18.

The movement of the carriage and the blade on the longer radius about shaft 51 has been described as the feed because the movement about that center is more nearly a straight line or rectilinear movement such as would be obtained from a sliding instead of a swinging movement. And the movement of the carriage and blade about the center 18 has been described as the angle adjustment movement because, at the shorter radius of that center, it requires less movement for a given change of angle. But, as will readily be understood, in this preferred form of machine where the main movement of the blade to and from the grinding wheel is a swinging rather than a rectilinear movement, either of the movements may be regarded as the feed and the other as the angle adjustment. In practice, they may take place more or less simultaneously; and, for using the shorter radius movement as a feed, the screw head 62 may also be a divided head, for the same purpose and with the same end as previously described for the divided head 57a.

Also, the release for backing off the blade without disturbing the angle setting, may be applied to the main feed screw 55 as well as to the feed screw 61 as has been described. Figures 14 and 15 show such an arrangement. In these figures the feed screw 55 is shown mounted in a swivel block 54 on bracket 53, the same as in Fig. 3. The nut block 156, as shown in Figs. 14 and 15, instead of being mounted directly on the shaft 18, is here shown as pivoted, at 200, to the upper end of an arm 201. The lower end of this arm 201 is pivotally and slidably mounted on rocker arm 50 by means of a pin 202 and slot 203. Arm 50 carries a lock pin 204 adapted to enter a slot 205 formed on the inner face of arm 201; and the lug on the inner face of this arm also has a latching face 206. It will immediately be recognized that the operation of the parts just described is in essence the same as the operation of the corresponding parts shown in Figs. 5 and 9; operating to release the rocker arm 50, and the whole rocking frame of which it forms a part without the necessity of changing the setting of the divided head 57.

Having described preferred embodiments of my invention it will be understood that the drawings and description are to be considered merely as illustrative of and not restrictive upon the broader claims appended hereto, for various changes in design, structure, and arrangement may be made by those skilled in the art without departing from the spirit and scope of the claims.

What I claim is:

1. In a grinder adapted to sharpen an elongate cutter blade, a grinding wheel, a frame, a rock-shaft rotatably mounted on the frame, a rod rotatably mounted on the frame, a blade holding carriage sliding on the rod, the rod and carriage being mounted to swing bodily about the rock-shaft axis to move the blade into grinding position, the carriage being mounted to oscillate about the rod, means to oscillate the carriage to shape the blade edge, the carriage and rod being adapted to rotate together about the rod axis to adjust the bevel on the blade by adjusting the inclination of the blade relative to a given tangent to the grinding wheel, and means to rotate the rod and carriage.

2. In a grinder of the character described, a grinding means, a base, a primary frame mounted on the base to move transversely to and from the grinding means, a longitudinal guide shaft carried in said frame, a blade carrier mounted to slide along and to swing about said guide shaft axis, a cam bar frame mounted on said guide shaft to be swingingly adjustable about its axis and engaging the carrier to determine its angular position about the shaft axis, means for adjustably setting the transverse position of the primary frame, and means for adjustably setting the angular position of the cam bar frame about the guide shaft axis, each of said last mentioned setting means including an adjusting screw, and one of said means including means for quick disconnection of its screw from the part adjusted thereby.

3. In a grinder of the character described, a grinding means, a base, a primary swinging frame pivotally mounted on the base on a longitudinal pivotal axis, a longitudinal guide shaft carried in said frame spaced from its pivotal axis, a blade carrier mounted to slide along and to swing about said guide shaft axis, a cam bar frame mounted on said guide shaft to be swingingly adjustable about its axis and engaging the carrier to determine its angular position about the shaft axis, means for adjustably setting the angular position of the primary frame about its pivotal axis, and means for adjustably setting the angular position of the cam bar frame about the guide shaft axis, each of said last mentioned setting means including an adjusting screw, and one of said means including means for quick disconnection of its screw from the part adjusted thereby.

4. In a grinder of the character described, a grinding means, a base, a primary frame mounted on the base to move transversely to and from the grinding means, a longitudinal guide shaft carried in said frame, a blade carrier mounted to slide along and to swing about said guide shaft axis, a cam bar frame mounted on said guide shaft to be swingingly adjustable about its axis and engaging the carrier to determine its angular position about the shaft axis, means for adjustably setting the transverse position of the primary frame, and means for adjustably setting the angular position of the cam bar frame about the guide shaft axis, said last mentioned setting means including a swinging arm connected with the cam bar frame, an adjusting screw rotatably mounted on the primary frame, a nut traversing the screw, and disconnectible means connecting the nut with said arm.

5. In a grinder of the character described, a grinding means, a base, a primary frame mounted on the base to move transversely to and from the grinding means, a longitudinal guide shaft carried in said frame, a blade carrier mounted to slide along and to swing about said guide shaft axis, a cam bar frame mounted on said guide shaft to be swingingly adjustable about its axis and engaging the carrier to determine its angular position about the shaft axis, means for adjustably setting the transverse position of the primary frame, and means for adjustably setting the angular position of the cam bar frame about the guide shaft axis, said first mentioned setting means including an adjusting screw rotatably mounted on the base, a nut traversing the screw, and disconnectible means connecting the nut with said primary frame.

6. Blade holding and registering means adapted to hold and register a blade in either of two end-for-end positions, including a blade holding member adapted to confine the blade laterally, a rotatable shaft mounted on said member longitudinally of the blade, a registration head fixed on each end of the shaft and each head having a lateral blade engaging projection, the two said projections being out of alinement with each other so that when the shaft and heads are turned to engage one projection with the blade the other projection will be out of contact with the blade.

WILLIAM WALTER HARTMAN.